US008563161B2

(12) United States Patent
Ogasawara et al.

(10) Patent No.: US 8,563,161 B2
(45) Date of Patent: Oct. 22, 2013

(54) POWER SUPPLY SYSTEM

(75) Inventors: Shigeyuki Ogasawara, Makinohara (JP); Katsunori Sato, Makinohara (JP); Hideki Inoue, Makinohara (JP); Motoo Nojima, Tokyo (JP)

(73) Assignee: Yazaki Corporation, Tokyo (JP)

( * ) Notice: Subject to any disclaimer, the term of this patent is extended or adjusted under 35 U.S.C. 154(b) by 164 days.

(21) Appl. No.: 12/831,296

(22) Filed: Jul. 7, 2010

(65) Prior Publication Data

US 2011/0008669 A1    Jan. 13, 2011

(30) Foreign Application Priority Data

Jul. 8, 2009 (JP) ................................. 2009-161407

(51) Int. Cl.
*H01M 2/24* (2006.01)

(52) U.S. Cl.
USPC ........... 429/160; 429/121; 429/158; 429/627; 429/500

(58) Field of Classification Search
USPC ............ 429/160, 96, 158, 159; 439/627, 500
See application file for complete search history.

(56) References Cited

U.S. PATENT DOCUMENTS

| 3,113,820 | A  | * | 12/1963 | Norden .......................... 439/114 |
| 5,643,393 | A  | * | 7/1997  | Genovese et al. ............. 156/714 |
| 6,261,719 | B1 | * | 7/2001  | Ikeda et al. .................... 429/211 |
| 6,399,238 | B1 | * | 6/2002  | Oweis et al. .................... 429/99 |
| 6,935,020 | B2 | * | 8/2005  | Ikeda ............................... 29/854 |
| 7,740,981 | B2 | * | 6/2010  | Hashida et al. ............... 429/160 |
| 8,114,540 | B2 | * | 2/2012  | Trester et al. .................. 429/160 |
| 8,235,732 | B2 | * | 8/2012  | Garascia et al. ............. 439/76.2 |
| 8,288,031 | B1 | * | 10/2012 | Matejek et al. ............... 429/123 |
| 2001/0046816 | A1 | * | 11/2001 | Saito et al. ..................... 439/736 |
| 2002/0098734 | A1 | * | 7/2002  | Ikeda ............................. 439/500 |
| 2007/0141457 | A1 |   | 6/2007  | Amagai |
| 2008/0199765 | A1 | * | 8/2008  | Yoon et al. ...................... 429/91 |
| 2008/0314657 | A1 | * | 12/2008 | Ikeda et al. .................. 180/65.1 |
| 2009/0253034 | A1 | * | 10/2009 | Nedelec ........................ 429/181 |
| 2010/0003585 | A1 |   | 1/2010  | Takahashi et al. |
| 2010/0323234 | A1 | * | 12/2010 | Kim et al. ..................... 429/158 |

(Continued)

FOREIGN PATENT DOCUMENTS

| CN | 1988215 A | 6/2007 |
| CN | 101084593 A | 12/2007 |
| JP | 2003-045409 A | 2/2003 |

OTHER PUBLICATIONS

Office Action dated Oct. 25, 2012, issued by the State Intellectual Property Office of the People's Republic of China in counterpart Chinese Patent Application No. 201010220244.2.

(Continued)

*Primary Examiner* — Joseph S Del Sole
*Assistant Examiner* — Nahida Sultana
(74) *Attorney, Agent, or Firm* — Sughrue Mion, PLLC

(57) ABSTRACT

A power supply system including a plurality of batteries includes a busbar, a terminal and a busbar module. The busbar connects a first electrode of one of the batteries with a second electrode of another one of the batteries. The terminal is mounted on the busbar and is contacted with the first electrode. The busbar module has a bulkhead defining a space accommodating the busbar. A locking member is extended from the bulkhead into the space and restricts the busbar. An abutment portion is provided at an edge part of the terminal. The abutment portion abuts the locking member when the terminal is rotated about the first electrode.

4 Claims, 8 Drawing Sheets

(56) References Cited

U.S. PATENT DOCUMENTS

| | | | |
|---|---|---|---|
| 2011/0045329 A1* | 2/2011 | Ikeda et al. | 429/91 |
| 2011/0104556 A1* | 5/2011 | Kim et al. | 429/160 |
| 2012/0056476 A1* | 3/2012 | Lee | 307/10.1 |
| 2012/0058374 A1* | 3/2012 | Aota et al. | 429/94 |
| 2012/0114991 A1* | 5/2012 | Park et al. | 429/82 |
| 2012/0164509 A1* | 6/2012 | Ogasawara et al. | 429/121 |
| 2013/0052516 A1* | 2/2013 | Kim | 429/159 |
| 2013/0143102 A1* | 6/2013 | Jiang et al. | 429/159 |

OTHER PUBLICATIONS

Office Action, dated Jul. 10, 2013, issued by the State Intellectual Property Office of the People's Republic of China in counterpart Chinese Application No. 201010220244.2.

* cited by examiner

POWER SUPPLY SYSTEM

BACKGROUND

The present invention relates to a power supply system which is made up of a plurality of batteries connected together in series and which is installed in a hybrid vehicle which can run by powers of both an internal combustion engine and an electric motor or an electric vehicle.

A power supply system 100 such as shown in FIG. 7 or 8, for example, is installed in a hybrid vehicle which can run by powers of both an internal combustion engine and an electric motor or an electric vehicle. The power supply system 100 shown in FIG. 7 or 8 includes a plurality of batteries 101 which are arranged so that different electrodes 105, 106 lie adjacent to each other, busbars 109 which each connect together the batteries 101 which lie adjacent to each other, a busbar module 103 in which a plurality of busbar accommodating spaces 102 are provided which each accommodate a busbar 109, and terminals 104 which connect to a voltage detection means (not shown) for measuring a potential difference between the positive electrodes 105 and the negative electrodes 106 which are connected together by the busbars 109.

In each battery 101, the positive electrode 105 is provided at one end and the negative electrode 106 is provided at the other end. In the batteries 101 which lie adjacent to each other, the positive pole 105 and the negative pole 106 lie adjacent to each other. Namely, the plurality of batteries 101 are aligned in such a state that the positive electrodes 105 and the negative electrodes 106 are located in opposite positions alternately.

The busbars 109 connect together the batteries 101 which lie adjacent each other and the positive electrodes 105 and the negative electrodes 106 which lie adjacent to each other so as to connect the batteries 101 in series.

The plurality of busbar accommodating spaces 102 are provided in the busbar module 103. The busbar module 103 is attached to end faces of the batteries 101 aligned. The busbar accommodating spaces 102 each accommodate the busbar 109 and the terminal 104 which connect to the voltage detection means.

The busbar accommodating space 102 is made up of a plurality of bulkheads 102a. The bulkheads 102 are each formed into a rectangular shape when viewed from the top. The plurality of bulkheads 102a are provided to be erected so as to encompass the busbar 109 and the terminal 104.

The bulkhead 102a includes a busbar fitting portion 107. The busbar fitting portion 107 includes a busbar locking portion 107A and a terminal locking portion 107B.

The busbar locking portion 107A is provided so as to project towards an inside of the busbar accommodating space 102. The busbar locking portion 107A presses the busbar 109 in a direction in which the battery 101 is disposed to thereby lock the busbar 109 in the busbar accommodating space 102.

The terminal locking portion 107B is provided so as to be spaced apart from the busbar locking portion 107A. The terminal locking portion 107B includes a slit 108A which is provided so as to penetrate through the bulkhead 102a and a frame portion 108B which is formed on an external surface of the bulkhead 102a.

The slit 108A is formed parallel to the end face of each of the batteries 101 which are aligned with one another. The slit 108A is formed into a straight-line shape when viewed from the top, so that an entering portion 104c of the terminal 104 can enter it.

The frame portion 108B is formed so as to project from the external surface of the bulkhead 102a. The frame portion 108B is formed into a substantially U-shape so as to connect both ends of the slit 108A.

The terminal 104 includes a main body portion 104a which is formed into a substantially rectangular shape and a connecting portion 104b. The terminal 104 is formed into a plate-like shape. The terminal 104 connects to the voltage detection means to measure potentials of the electrodes 105, 106 of the corresponding battery 101.

The entering portion 104c is provided on the main body portion 104a. The entering portion 104c is provided so as to extend outwardly of the busbar accommodating space 102 from the main body portion 104a. The entering portion 104c enters the slit 108A.

In the power supply system 100 that is configured as has been described heretofore, when the terminal 104 rotates about the electrode 105 or 106, in the terminal locking portion 107B, an outer edge of the entering portion 104c that has entered the slit 108A is brought into abutment with an inner edge of the frame portion 108B to thereby prevent the terminal 104 from rotating about the electrode 105 or 106 to which the terminal 104 is attached.

[Patent Document 1] Japanese Patent Publication Number 2003-45409

As described above, the related power supply system 100 has the construction in which the busbar locking portion 107A which mounts the busbar 109 in the busbar accommodating space 102 is independent from the terminal locking portion 107B which prevents the terminal 104 from rotating about the electrode 105 or 106. Because of this, there has been a tendency that the busbar fitting portion 107 is formed large. Further, there has been a tendency that the busbar fitting portion has a complex configuration. In addition, there has been a problem that the amount of a resin material used for the busbar fitting portion 107 is increased.

SUMMARY

It is therefore an advantage of some aspects of the invention to provide a power supply system which can reduce the amount of a resin material used for reduction in material costs.

According to one aspect of the invention, there is provided a power supply system including a plurality of batteries, comprising:

a busbar connecting a first electrode of one of the batteries with a second electrode of another one of the batteries;

a terminal mounted on the busbar and contacted with the first electrode;

a busbar module having a bulkhead defining a space accommodating the busbar;

a lock member extended from the bulkhead into the space and restricting the busbar; and an abutment portion provided at an edge part of the terminal and configured to abut the lock member when the terminal is rotated about the first electrode.

The power supply system may be configured such that: the bulkhead is formed with a slit; and an entering portion provided on the terminal is inserted into the slit.

The power supply system may be configured such that: the bulkhead includes a first wall from which the lock member is extended and a second wall opposing the first wall; and another lock member is extended from the second wall of the bulkhead into the space and restricts the busbar.

DETAILED DESCRIPTION OF EXEMPLIFIED EMBODIMENTS

Figure 1:
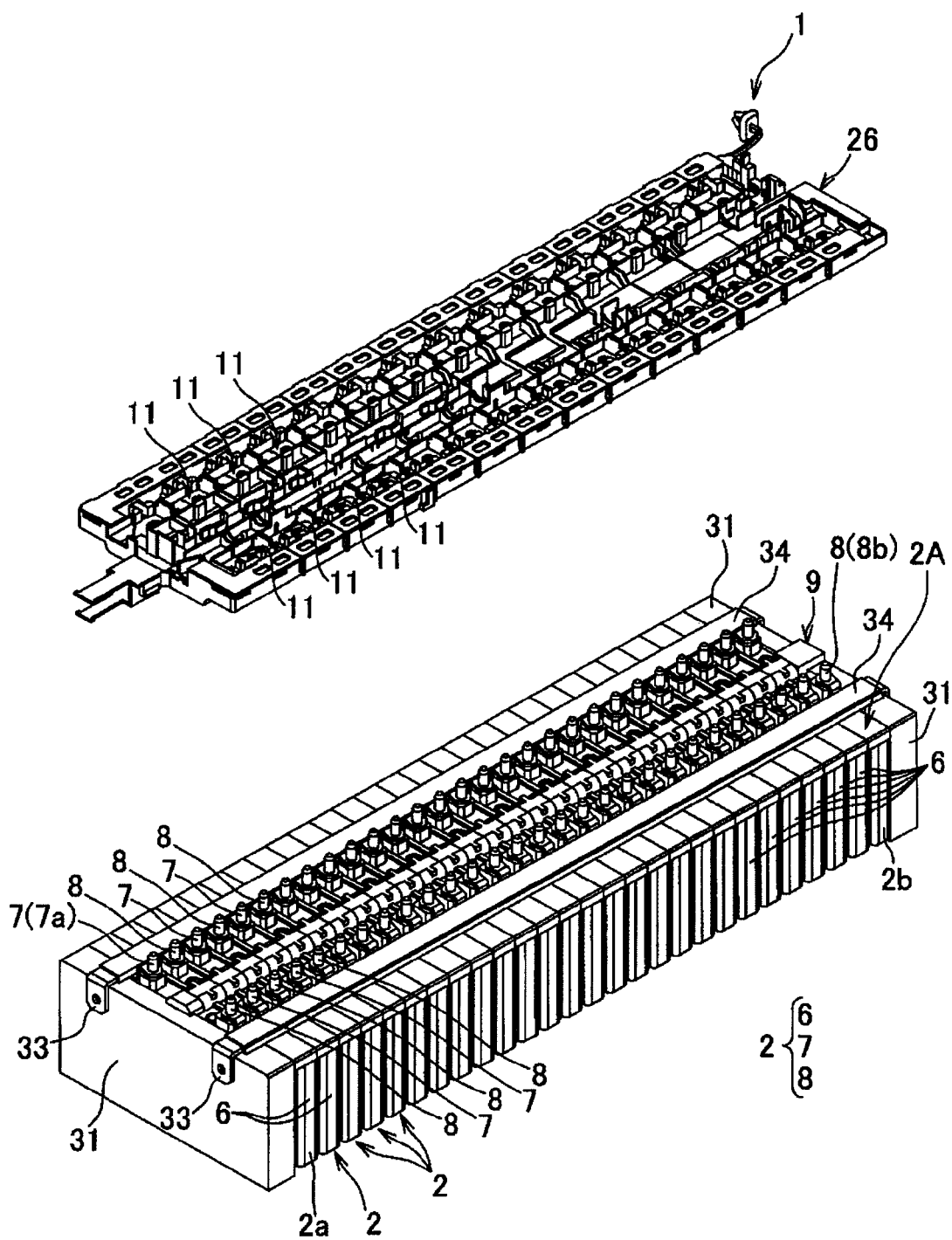
FIG. 1 is a perspective view of a power supply system according to an embodiment of the present invention.

A power supply system according to an embodiment of the invention is described by reference to FIGS. 1 to 6. A power supply system 1 shown in FIG. 1 is installed in a hybrid vehicle which can run by means of driving forces of both an internal combustion engine and an electric motor or an electric vehicle which can run by means of a driving force of an electric motor.

Figure 2:
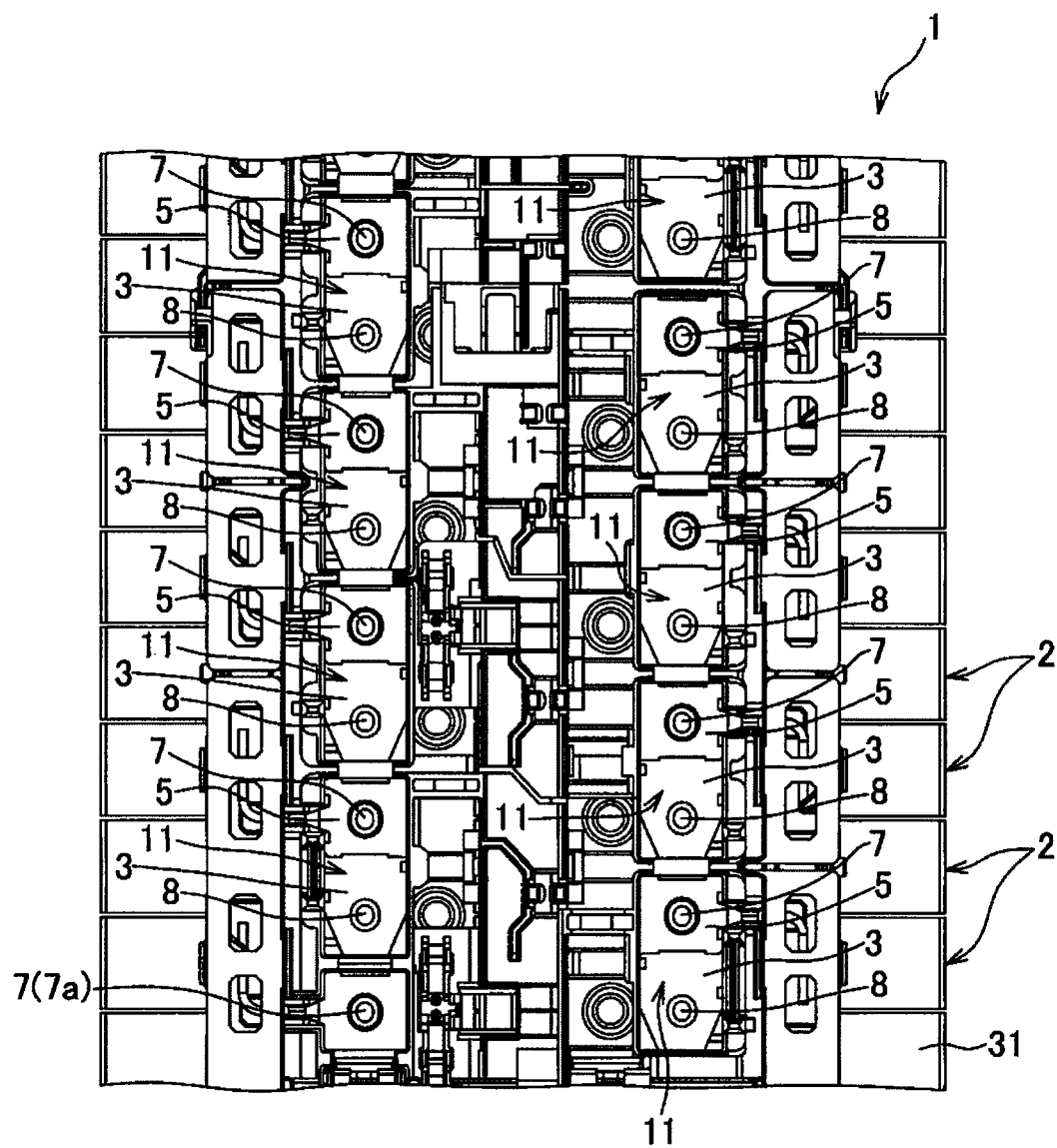
FIG. 2 is a top view of the power supply system shown in FIG. 1.
Figure 3:
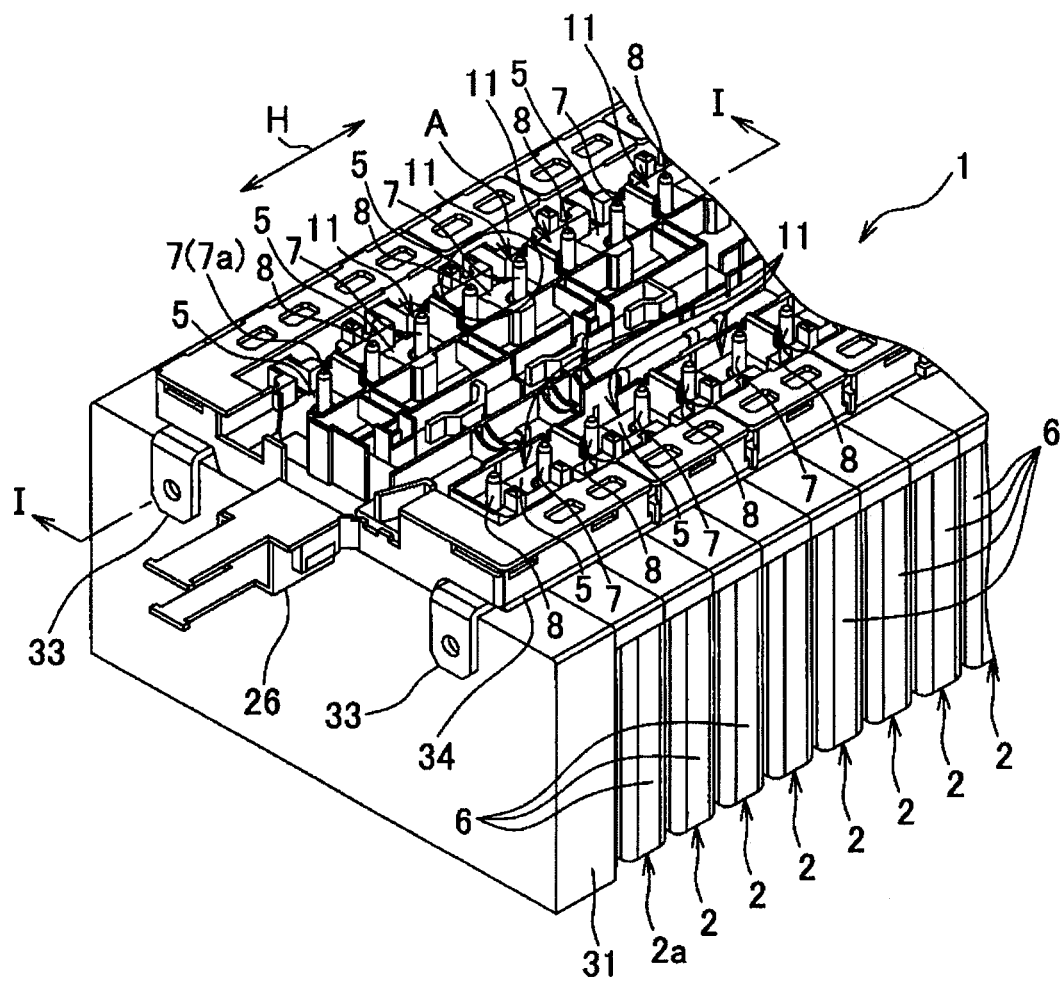
FIG. 3 is a perspective view showing the power supply system shown in FIG. 1 in an enlarged fashion.
Figure 4:
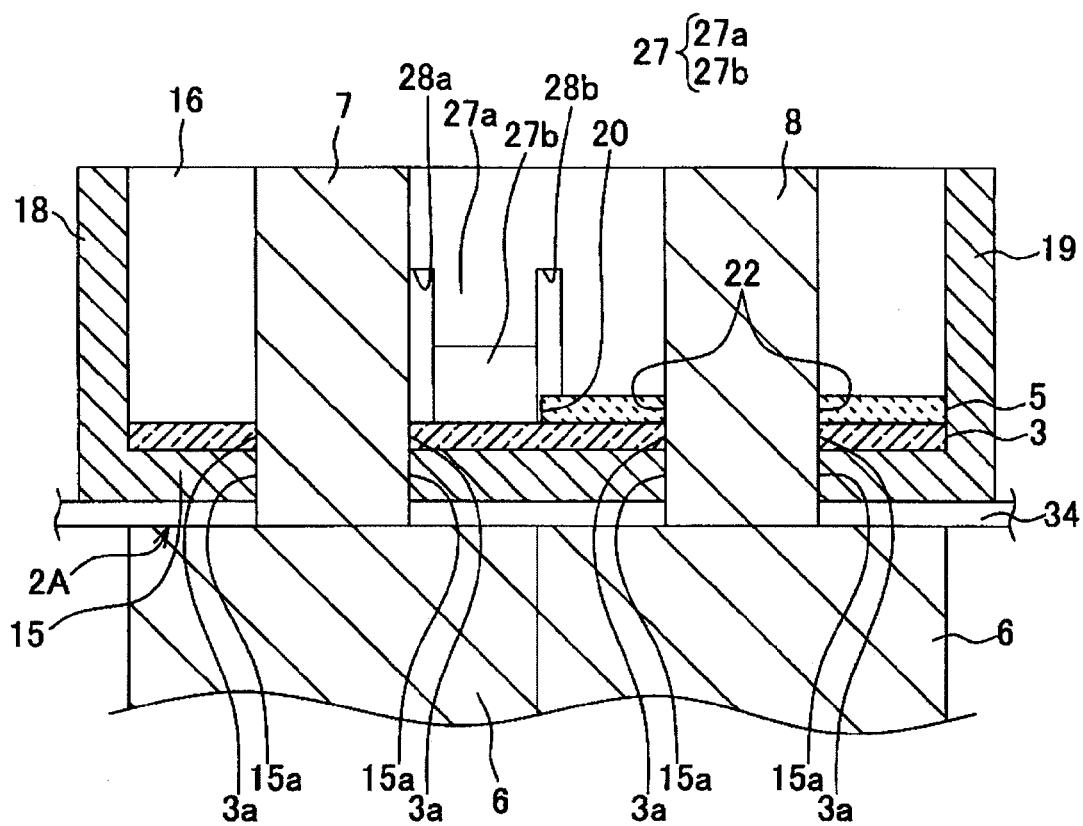
FIG. 4 is a sectional view taken along the line I-I to show a portion A of the power supply system shown in FIG. 3 in an enlarged fashion.
Figure 5:
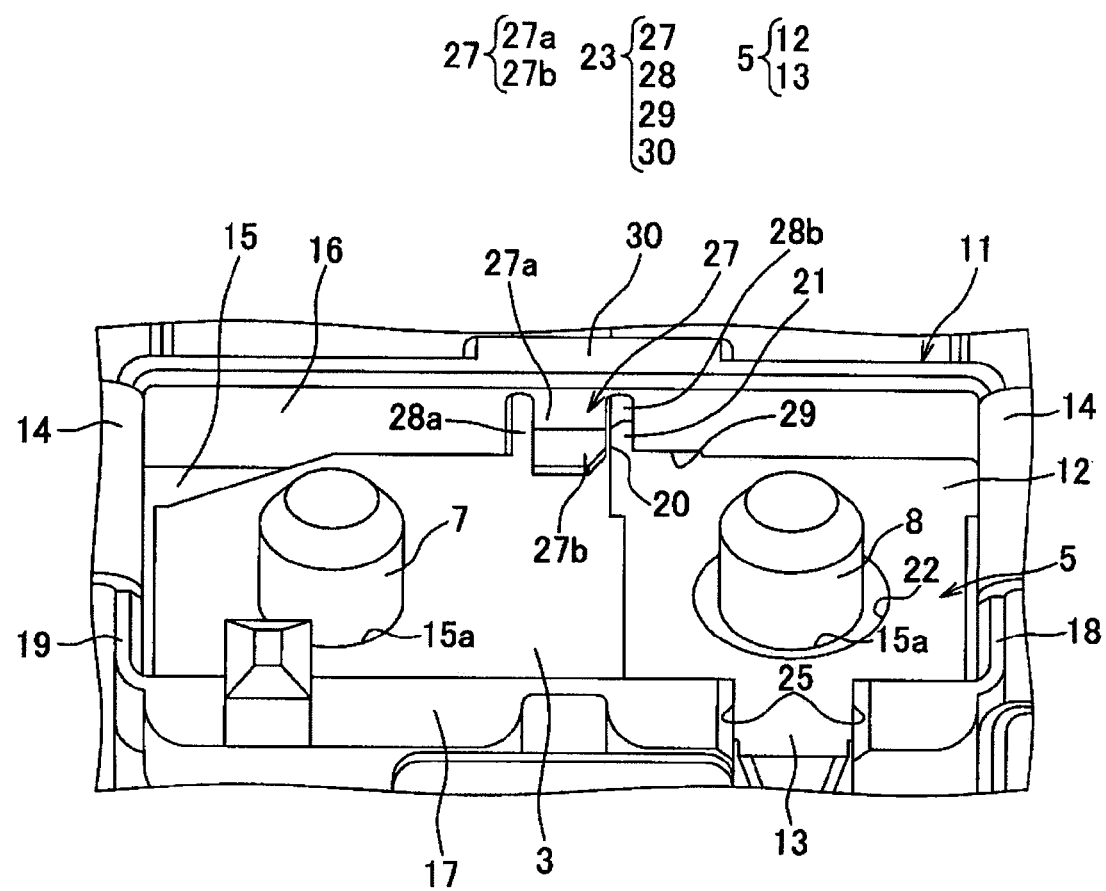
FIG. 5 is a perspective view showing the portion A of the power supply system shown in FIG. 3 in an enlarged fashion.
Figure 6:
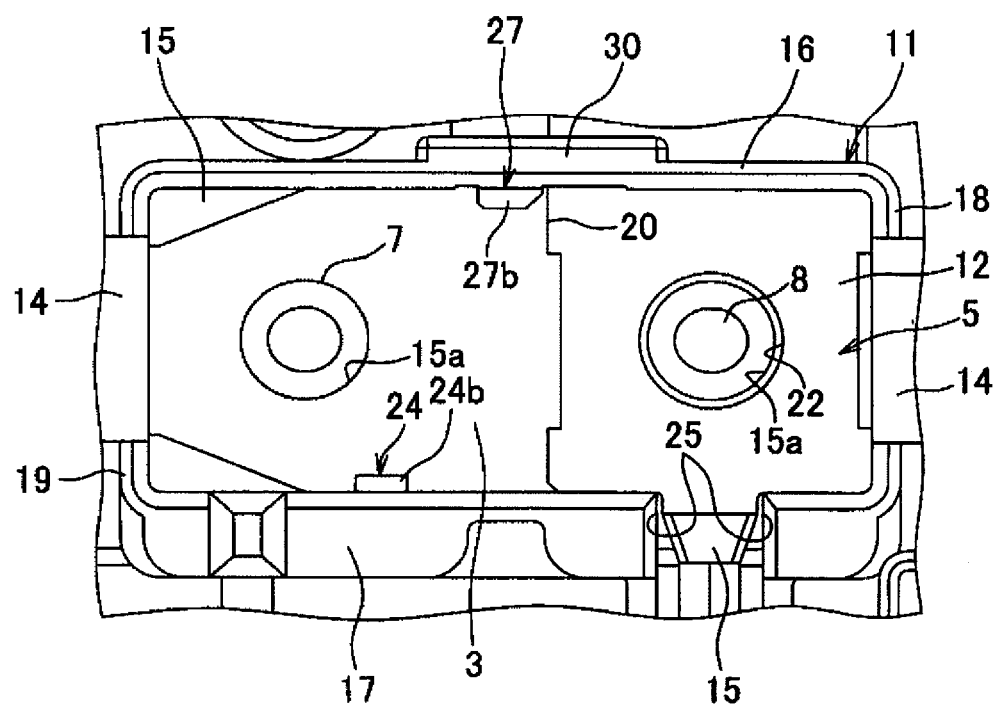
FIG. 6 is a top view showing the portion A of the power supply system shown in FIG. 3 in an enlarged fashion.
Figure 7:
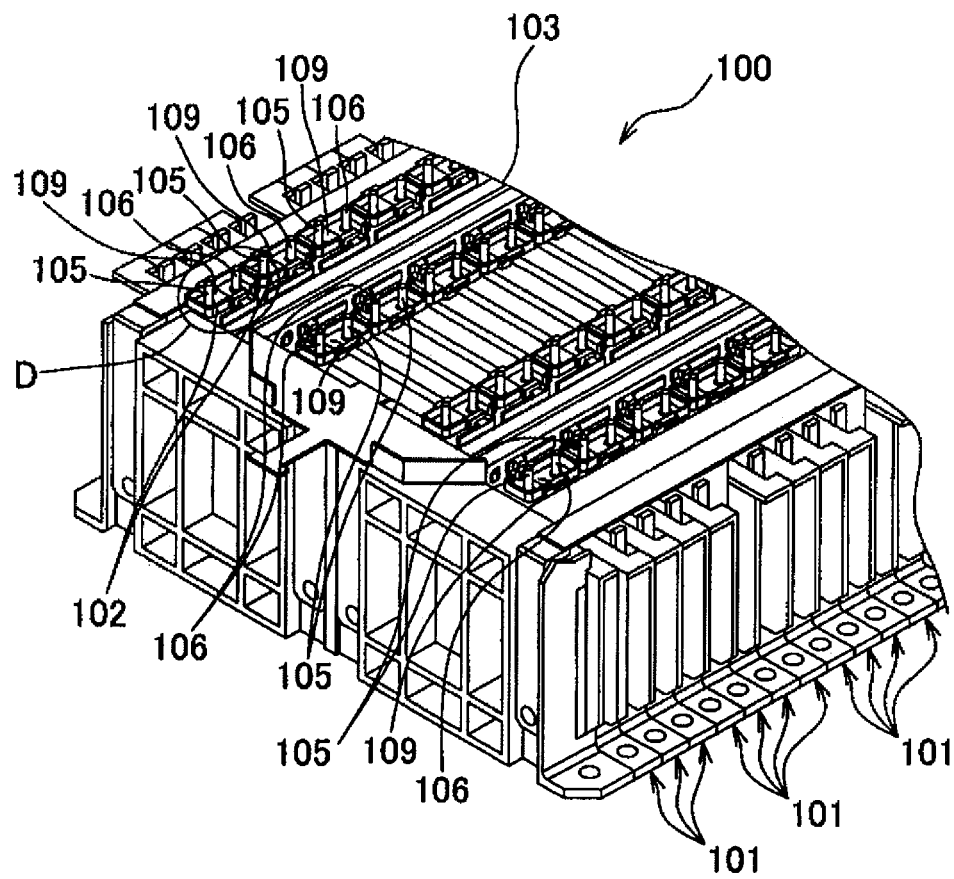
FIG. 7 is a perspective view showing an example of a related power supply system.
Figure 8:
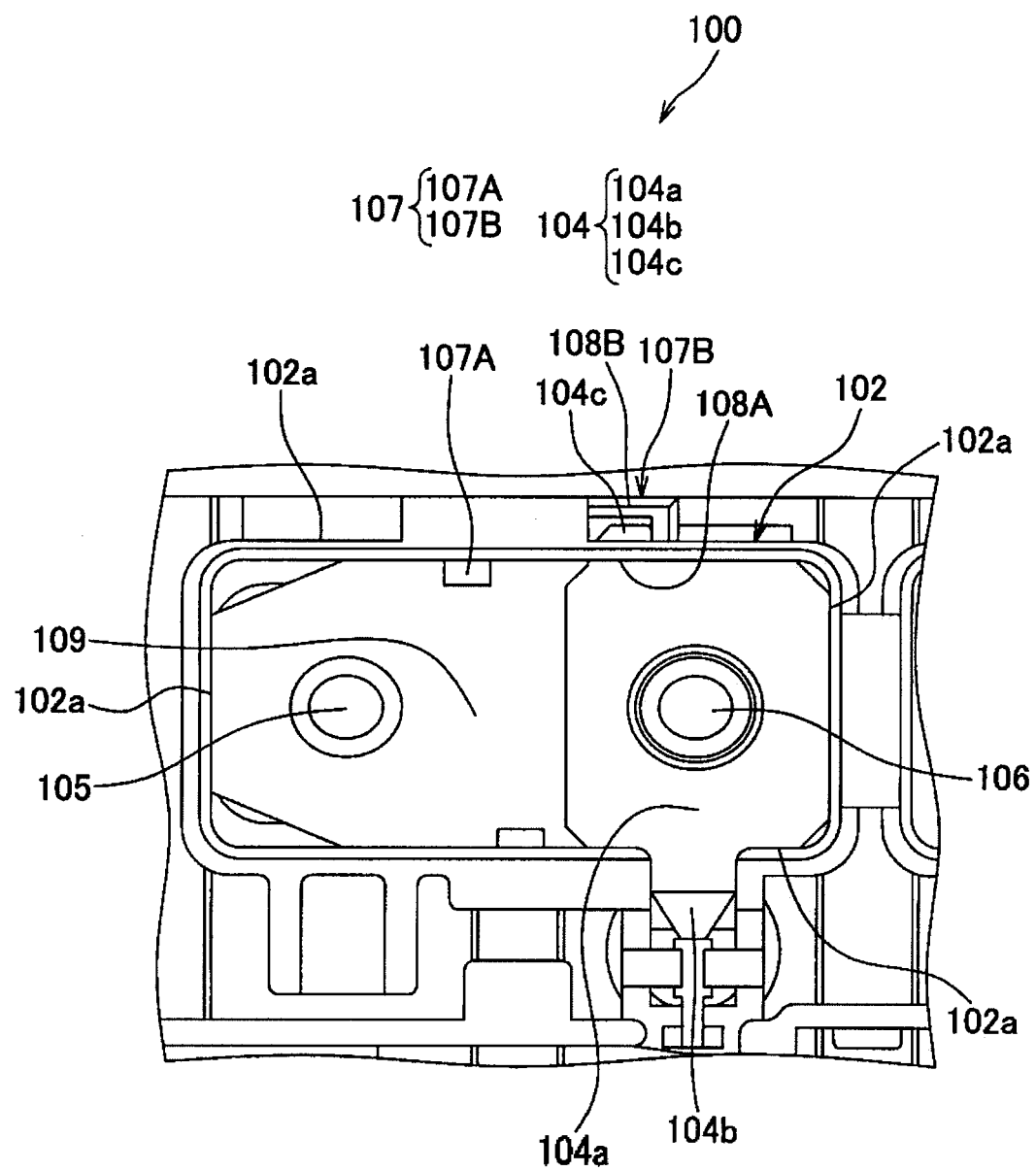
FIG. 8 is a top view showing a portion D of the related power supply system shown in FIG. 7 in an enlarged fashion.

As is shown in FIG. 2, the power supply system 1 includes a battery assembly 9 which includes, in turn, a plurality of batteries 2 each having a positive electrode 7 and a negative electrode 8, busbars 3 which each connect the batteries 2 which lie adjacent to each other, a busbar module 26 in which at least one busbar accommodating space 11 is provided to accommodate individually the busbar 3, and terminals 5 which connect to a voltage detection means (not shown) for measuring a potential difference between the positive electrode 7 and the negative electrode 8 of each battery 2.

The battery assembly 9 includes the plurality of batteries 2, a pair of end plates 31 which hold the plurality of batteries 2 therebetween, and a battery binding portion 32 for binding together the plurality of batteries 2 and the end plates 31.

The battery 2 includes a rectangular parallelepiped battery main body 6 and the positive electrode 7 and the negative electrode 8.

The positive electrode 7 is provided so as to be spaced apart from one end of the battery main body 6. The negative electrode 8 is provided so as to be spaced apart from the other end of the battery main body 6. The positive electrode 7 and the negative electrode 8 are formed into a rod-like shape and are provided so as to project in the same direction from one end face 2A of the battery main body 6. The positive electrode 7 and the negative electrode 8 are provided parallel to each other.

The plurality of batteries 2 are arranged along one direction H in such a state that the positive electrodes 7 and the negative electrodes 8 lie adjacent to each other and that the one end faces 2A of the battery main bodies 6 are positioned on the same plane. In the batteries 2 which lie adjacent to each other, the positive electrode 7 of one battery 2 lies adjacent to the negative electrode 8 of the other battery 2. Namely, the plurality of batteries 2 are stacked together in such a state that the positive electrodes 7 and the negative electrodes 8 are located in opposite positions alternately.

The end plate 31 is made of an insulating synthetic resin. The end plate 31 is formed into a plate-like shape. The pair of end plates 31 holds the plurality of batteries 2 aligned along the one direction H therebetween. In addition, the end plates 31 are bound together with the plurality of batteries 2 by the battery binding portion 32.

The battery binding portion 32 includes binding bands 33 and band covers 34. The binding band 33 is made of an insulating synthetic resin. The binding band 33 is formed into a strap-like shape. A pair of binding bands 33 is provided as the binding bands. The pair of binding bands 33 is disposed side by side on the one end faces 2A so as to be in parallel with the one direction H in which the plurality of batteries 2 are aligned. In addition, the pair of binding bands 33 is provided so as to be spaced apart from each other. The binding bands 33 are fixed with bolts or the like at longitudinal ends thereof so as to bind together the plurality of batteries 2 and the end plates 31 as an integral unit.

The band cover 34 is made of an insulating synthetic resin. The band cover 34 is formed into a strap-like shape. A pair of band covers 34 is provided as the band covers. The band cover 34 is superposed on an outwardly exposed surface of the binding band 33. Then, the busbar module 26 is superposed on the outwardly exposed surfaces of the band covers 34.

The busbar 3 includes a pair of busbar holes 3a through which the positive electrode 7 and the negative electrode 8 can be passed. The busbar 3 is made of a conductive metal and is formed into a strap-like shape. The busbar 3 is accommodated in busbar accommodating space 11 of the busbar module 26. In the busbar 3, the positive electrode 7 is passed through one of the pair of busbar holes 3a and the negative busbar 8 is passed through the other busbar hole 3a, so as to connect together the electrodes 7, 8 having different polarities of the adjacent batteries 2.

The busbar hole 3a is formed into a circular shape when viewed from the top. The busbar hole 3a penetrates through the busbar 3. The pair of busbar holes 3a is disposed substantially at a center of the busbar 3 so as to be spaced apart from each other. An inner circumference of the busbar hole 3a is formed so as to contact the electrode 7 or 8.

The busbar module 26 includes integrally the plurality of busbar accommodating spaces 11 and connecting members 14 which each connect together the busbar accommodating spaces 11 which lie adjacent to each other.

The busbar accommodating spaces 11 are disposed on the plurality of batteries 2 which are aligned along the one direction H excluding a position which overlaps the positive electrode 7 (hereinafter, denoted by reference numeral 7a) of the battery 2 (hereinafter, denoted by reference numeral 2a) which is positioned at one end of the plurality of batteries 2 and a position which overlaps the negative electrode 8 (hereinafter, denoted by 8b) of the battery 2 (hereinafter, denoted by reference numeral 2b) which is positioned at the other end of the plurality of batteries 2.

The busbar accommodating space 11 includes a bottom wall 15 which is superposed on the band cover 34 and is defined by a bulkhead which includes a first bulkhead 16, a second bulkhead 17, a third bulkhead 18, and a fourth bulkhead 19. The first to fourth bulkheads 16, 17, 18, 19 are provided so as not only to connect to an outer edge of the bottom wall 15 but also to be erected therefrom. The busbar accommodating spaces 11 are aligned in two rows along the one direction H. The busbar accommodating space 11 accommodates the busbar 3 and a terminal 5, which will be described later, within an area defined by the first to fourth bulkheads 16, 17, 18, 19.

The bottom wall 15 includes a pair of holes 15a through which the positive electrode 7 and the negative electrode 8 can be passed. The bottom wall 15 is formed into a substantially rectangular shape. With the positive electrode 7 passed through one hole 15a, and the negative electrode 8 passed through the other hole 15a, of the pair of holes 15a in each bottom wall 15, the busbar module 26 is superposed on the outwardly exposed faces of the band covers 34.

The hole 15a is formed into a circular shape when viewed from the top. The hole 15a penetrates through the bottom wall 15. The pair of holes 15a is formed at a center of the bottom wall 15 so as to be spaced apart from each other. The hole 15a communicates with the busbar hole 3a and a terminal hole 22 which is provided in the terminal 5, which will be described later. The pair of holes 15a allows the positive electrode 7 and the negative electrode 8 to pass therethrough.

The first bulkhead 16 and the second bulkhead 17 are each formed into a substantially rectangular shape. The first bulkhead 16 and the second bulkhead 17 are disposed so as to be spaced apart from each other while opposing each other. The third bulkhead 18 and the fourth bulkhead 19 are each formed into a substantially rectangular shape. The third bulkhead 18 and the fourth bulkhead 19 are disposed so as to be spaced apart from each other while opposing each other. One of edges of the first bulkhead 16 connects to one of edges of the fourth bulkhead 18. The other edge of the first bulkhead 16 connects to one of edges of the fourth bulkhead 19. The other edge of edges of the second bulkhead 17 connects to the other edge of the third bulkhead 18. One edge of the second bulkhead 17 connects to the other edge of the fourth bulkhead 19. The first bulkhead 16, the second bulkhead 17, the third bulkhead 18 and the fourth bulkhead 19 constitute "a plurality of bulkheads" described in a claim appended hereto.

The first bulkhead 16 includes a busbar fitting portion 23. The busbar fitting portion 23 is disposed substantially at a center of the first bulkhead 16. The busbar fitting portion 23 includes a locking member 27, a pair of through holes 28a, 28b which hold the locking member 27 therebetween, a slit 29 which is formed integrally so as to communicate with the through hole 28b and a frame-shaped wall 30.

The locking member 27 includes a main body portion 27a and a projection 27b. The locking member 27 is disposed in a position where an abutment portion 20 which is part of an outer edge of the terminal 5, which will be described later, can be brought into abutment therewith when the terminal 5 rotates about the electrode 7 or 8 on which the terminal 5 is mounted. The locking member 27 has flexibility. The locking member 27 and the bottom wall 15 hold the busbar 3 therebetween so that the busbar 3 is mounted in the busbar accommodating space 11.

The main body portion 27a is formed into a substantially rectangular shape. The main body portion 27a is held between the pair of through holes 28a, 28b. The main body portion 27a is formed by the pair of through holes 28a, 28b, being made to penetrate through the first bulkhead 16. One end of the main body portion 27a which is spaced away from the battery 2 connects to the first bulkhead 16 and is formed integrally therewith. The other end of the main body portion 27a which lies close to the battery 2 is made into a free end. The projection 27b is formed at the other end of the main body portion 27a which lies close to the battery 2.

The projection 27b is provided so as to project towards an inside of the busbar accommodating space 11. The projection 27b is formed parallel to the one end face 2A. The projection 27b is provided so as to be brought into abutment with a face of the busbar 3 when the busbar 3 is accommodated in the busbar accommodating space 11.

The pair of through holes 28a, 28b penetrates through the first bulkhead 16. The pair of through holes 28a, 28b is formed into a substantially rectangular shape when viewed from the top. The pair of through holes 28a, 28b is at right angles to the one end face 2A in their longitudinal direction. The pair of through holes 28a, 28b is disposed parallel to each other while being disposed so as to be spaced apart from each other. Of the pair of through holes 28a, 28b, the through hole 28b which is disposed closer to the terminal 5 communicates with the slit 29. The through hole 28b is made to communicate with the slit 29 to thereby be formed into a substantially L-shape.

The slit 29 penetrates through the first bulkhead 16. The slit 29 is formed parallel to the one end face 2A. The slit 29 connects to an end of the through hole 28b which lies closer to the battery 2 and is formed in a direction in which it is spaced away from the through hole 28a. The slit 29 is provided adjacent to a side of the locking member 27 which lies closer to the terminal 5. The slit 29 is formed so as to allow an entering portion 21 of the terminal 5 to be inserted thereinto.

The frame-shaped wall 30 is disposed substantially at the center of the first bulkhead 16. The frame-shaped wall 30 is provided on an external face of the first bulkhead 16. The frame-shaped wall 30 is provided to project outwards of the busbar accommodating space 11 so as to surround the locking member 27, the pair of through holes 28a, 28b and the slit 29. The frame-shaped wall 30 is formed into a substantially U-shape with an edge thereof opened which lies closer to the battery 2.

The second bulkhead 17 includes another locking member 24, a pair of through holes (not shown) which holds the locking member 24 therebetween, and a connecting portion passage opening 25.

The locking member 24 (shown in FIG. 6) includes a main body portion (not shown) and a projection 24b. The locking member 24 has flexibility. The locking member 24 and the bottom wall 15 hold the busbar 3 therebetween to thereby mount the busbar 3 in the busbar accommodating space 11.

The main body portion (not shown) is formed into a substantially rectangular shape. The main body portion is disposed between the pair of through holes (not shown). One end of the main body portion which is spaced away from the battery 2 connects to the second bulkhead 17 so as to be formed integrally therewith. The other end of the main body portion which lies closer to the battery 2 is made into a free end. The projection 24b is formed on the end of the main body portion which lies closer to the battery 2.

The projection 24b is provided so as to project towards the inside of the busbar accommodating space 11. The projection 24b is formed parallel to the one end face 2A. The projection 24b is provided so as to be brought into abutment with the face of the busbar 3 when the busbar 3 is accommodated in the busbar accommodating space 11.

The pair of through holes (not shown) penetrates through the second bulkhead 17. The pair of through holes is formed into a substantially rectangular shape when viewed from the top. The pair of through holes is at right angles to the one end face 2A in their longitudinal direction. The pair of through holes is disposed parallel to each other while being spaced apart from each other.

The connecting portion passage opening 25 is provided in the second bulkhead 17. In the connecting portion passage opening 25, the second bulkhead 17 is cut out along an overall length of the second bulkhead 17 in a width direction thereof. The connecting portion passage opening 25 is formed into a substantially rectangular shape when viewed from the top. The connecting portion passage opening 25 allows a connecting portion 13, to pass therethrough outwardly of the busbar accommodating space 11.

There are provided a plurality of connecting members 14. The connecting member 14 is formed into a substantially U-shape. The connecting member 14 is formed integrally with the busbar accommodating spaces 11 which lie adjacent to each other so as to connect together the adjacent busbar accommodating spaces 11. One end of the connecting member 14 connects to the third bulkhead 18. The other end of the connecting member 14 connects to the fourth bulkhead 19.

The terminal 5 includes a main body portion 12 which has a substantially rectangular shape when viewed from the top and the connecting portion 13 which is provided so as to extend outwards of the busbar accommodating space 11 from the main body portion 12. The terminal 5 is made of a conductive metal such as copper, for example. The terminal 5 is formed into a substantially flat plate-like shape. The terminal 5 is mounted on either of the electrodes 7, 8 which are connected together by the busbar 3. The terminal 5 is superposed on the exposed face of the busbar 3 which constitutes an opposite side to a side thereof which faces the bottom wall 15 of the busbar accommodating space 11. The terminal 5 connects to the voltage detection means, via electric wires. The terminal 5 outputs potentials of the positive electrode 7 and the negative electrode 8, which confront each other in a direction intersecting the one direction H, of the battery 2 on which the terminal 5 is mounted to the voltage detection means.

The main body portion 12 includes the terminal hole 22, the abutment portion 20 which is provided in a position where the locking member 27 is brought into abutment therewith when the terminal 5 rotates about the electrode 7 or 8 on which the terminal 5 is mounted, and the entering portion 21 which is provided so as to extend outwards of the busbar accommodating space 11 from the abutment portion 20. The main body portion 12 is formed into a substantially rectangular shape.

The terminal hole 22 is disposed substantially at a center of the main body portion 12. The terminal hole 22 is formed into a circular shape when viewed from the top. The terminal hole 22 penetrates through the main body portion 12. The terminal hole 22 communicates with the busbar hole 3a and the hole 15a provided in the bottom wall 15 of the busbar accommodating space 11. The terminal hole 22 allows either of the electrodes 7, 8, which are connected together by the busbar 3, passes therethrough.

The abutment portion 20 is provided at an end portion which lies closer to the first bulkhead 16 of a longitudinal edge which lies spaced away from the third bulkhead 18 of the main body portion 12. The abutment portion 20 is provided at an outer edge of the main body portion 12a. The abutment portion 20 is provided in the position where the locking member 27 is brought into abutment therewith when the terminal 5 rotates about the electrode 7 or 8 on which the terminal 5 is mounted. Namely, the abutment portion 20 is provided in proximity to the locking member 27.

The entering portion 21 is provided so as to extend outwards of the busbar accommodating space 11 from an end portion which lies spaced away from the third bulkhead 18 of a widthwise edge which lies closer to the first bulkhead 16 of the main body portion 12. The entering portion 21 is provided adjacent to the abutment portion 20. The entering portion 21 is formed into a rectangular shape when viewed from the top. The entering portion 21 is inserted into the slit 29.

The connecting portion 13 is provided so as to extend outwards of the busbar accommodating space 11 from a center of a widthwise edge of the main body portion 12 which lies closer to the second bulkhead 17. The connecting portion 13 is passed through the connecting portion passage opening 25. The connecting portion 13 connects the voltage detection means, with the main body portion 12 via electric wires (not shown) which are attached to the connecting portion 13.

The voltage detection means is an ECU (Electronic Control Unit), not shown. The ECU, which is the voltage detection means, measures a potential difference between the positive electrode 7 and the negative electrode 8 of each battery 2.

Next, an assembling procedure of the power supply system 1 is described. Firstly, the plurality of batteries 2 are aligned along the one direction H so that the positive electrodes 7 and the negative electrodes 8 lie adjacent to each other alternately. Then, the pair of end plates 31 is disposed so as to hold the plurality of batteries 2 therebetween. Then, the pair of binding bands 33 is disposed on the one end faces 2A of the batteries 2 in parallel with the one direction H in which the plurality of batteries 2 are aligned while being spaced apart from each other. Then, the binding bands 33 are fixed at the longitudinal ends thereof with bolts or the like, whereby the plurality of batteries 2 and the end plates 31 are bound together so as to be held integrally. Then, the band covers 34 are superposed on the outwardly exposed faces of the corresponding binding bands 33. The battery assembly 9 is built up in this way.

Next, the busbars 3 are superposed on the bottom walls 15 of the respective busbar accommodating spaces 11 of the busbar module 26. Then, the busbars 3 are inserted to be held between the bottom walls 15 and the projections 27b so that the locking projections 27 press the busbars 3 against the bottom walls 15, whereby the busbars 3 are locked in the busbar accommodating spaces 11. As these occur, busbar holes 3a in the busbars 3 communicate with the holes 15a in the bottom walls 15. In this way, the busbars 3 are accommodated in the corresponding busbar accommodating spaces 11.

Next, of the pairs of busbar holes 3a provided in the busbars 3 accommodated in the busbar accommodating spaces 11, the terminal holes 22 in the terminals 5 are superposed on only the busbar holes 3a which lie closer to the third bulkheads 18 of the busbar accommodating spaces 11. Then, the entering portions 21 are made to enter the corresponding slits 29. Then, the connecting portions 13 are inserted into the corresponding connecting portion passage openings 25. In this way, the busbars 3 and the terminals 5 superposed on the busbars 3 are accommodated in the busbar accommodating spaces 11.

Next, the respective electrodes 7, 8 excluding the positive electrode 7a and the negative electrode 8b are inserted through the pairs of holes 15a in the bottom walls 15, and the busbar module 26 is superposed on the exposed faces of the band covers 34. In this way, the busbar module 26 in which the busbars 3 and the terminals 5 are mounted is superposed on the battery assembly 9.

Lastly, nuts (not shown) are screwed on outer circumferences of the respective positive electrodes 7 and the negative electrodes 8, whereby the busbar module 26 in which the busbars 3 and the terminals 5 are mounted is assembled on to the battery assembly 9. The power supply system 1 is then completed in this way.

As described above, the positive electrodes 7 and the negative electrodes 8 which lie adjacent to each other alternately are electrically connected in series by the busbars 3 except for the positive electrode 7a of the battery 2a positioned at the one end of the one direction H and the negative electrode 8b of the battery 2b positioned at the other end of the one direction H. Then, the plurality of batteries 2 are electrically connected in series to each other.

In addition, the terminals 5 come into contact with the busbars 3 by the terminals 5 being superposed on the busbars 3. Then, the terminals 5 are electrically connected to the busbars 3.

In this way, the terminals 5 are electrically connected to the ECU, which is the voltage detection means, via electric wires (not shown). The terminals 5 output potential differences between the positive electrodes 7 and the negative electrodes 8 of the respective batteries 2 on which the terminals 5 are mounted to the ECU, which is the voltage detection means. The ECU, which is the voltage detection means, measures a potential difference between the positive electrode 7 and the negative electrode 8 of each battery 2 which face each other in the direction which intersects the one direction H. Then, the power supply system 1 can measure the residual capacities of the respective batteries 2.

According to the embodiment, when the terminal 5 rotates about the electrode 7 or 8 on which the terminal 5 is mounted, the locking member 27 provided inside the busbar accommodating space 11 is brought into abutment with the abutment portion 20 provided on the outer edge of the terminal 5. Then, the terminal 5 is prevented from rotating about the electrode 7 or 8 on which it is mounted. Because of this, the locking portions 107B on the related power supply system 100 are made unnecessary. Consequently, compared with the related power supply system 100, in the power supply system 1 of the invention, the busbar fitting portions 23 can be formed smaller to such an extent that the locking portions 107B are made unnecessary. This can realize a reduction in the amount of resin material used for forming the busbar accommodating spaces 11, whereby not only can the amount of $CO_2$ emitted be reduced but also the yield of the resin material used can be increased, thereby making it possible to reduce the material costs.

In addition, the construction of the busbar fitting portion 23 becomes simpler to such an extent that the locking portion 107B is made unnecessary.

This serves to simplify the construction of a mold for forming the busbar module 26.

Additionally, by the entering portion 21 of the terminal 5 entering the slit 29 provided in the first bulkhead 16, the rotation of the terminal about the electrode 7 or 8 on which it is mounted can be prevented in a more ensured fashion.

Note that a "slit" described in the claim appended hereto is the slit 20 described in this specification. However, the through hole 28a described in this specification may be referred to as the "slit." Both the through hole 28a and the slit 20 which are described in this specification may be referred to as the "slit" described in the claim appended hereto.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Applications No. 2009-161407 filed Jul. 8, 2009 including specifications, drawings and claims are incorporated herein by reference in their entirety.

What is claimed is:

1. A power supply system including a plurality of batteries, comprising:
    a busbar connecting a first electrode of one of the batteries with a second electrode of another one of the batteries;
    a terminal mounted on the busbar and contacted with the first electrode being disposed in a plane;
    a busbar module having a bulkhead defining a space accommodating the busbar;
    a locking member extended from the bulkhead along the plane into the space and restricting the busbar; and
    an abutment portion provided at an edge part of the terminal and in proximity to the locking member, wherein the abutment portion is configured to be brought into abutment with the locking member and to prevent the terminal from rotating about the first electrode.

2. The power supply system as set forth in claim 1, wherein:
    the bulkhead is formed with a slit; and
    an entering portion provided on the terminal is inserted into the slit.

3. The power supply system as set forth in claim 1, wherein:
    the bulkhead includes a first wall from which the locking member is extended and a second wall opposing the first wall; and
    another locking member is extended from the second wall of the bulkhead into the space and restricts the busbar.

4. The power supply system as set forth in claim 1, wherein:
    the locking member is flexible.

* * * * *